United States Patent
Pyla et al.

(10) Patent No.: US 9,141,544 B2
(45) Date of Patent: Sep. 22, 2015

(54) CACHE MEMORY WITH WRITE THROUGH, NO ALLOCATE MODE

(71) Applicant: QUALCOMM Incorporated, San Diego, CA (US)

(72) Inventors: Manojkumar Pyla, San Diego, CA (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 13/655,593

(22) Filed: Oct. 19, 2012

(65) Prior Publication Data

US 2013/0346705 A1    Dec. 26, 2013

Related U.S. Application Data

(60) Provisional application No. 61/664,368, filed on Jun. 26, 2012.

(51) Int. Cl.
*G06F 12/08* (2006.01)

(52) U.S. Cl.
CPC ........ *G06F 12/0804* (2013.01); *G06F 12/0888* (2013.01); *G06F 2212/601* (2013.01)

(58) Field of Classification Search
CPC .......... G06F 2212/601; G06F 12/0804; G06F 12/088
See application file for complete search history.

(56) References Cited

U.S. PATENT DOCUMENTS

| | | | | |
|---|---|---|---|---|
| 4,899,275 | A | * | 2/1990 | Sachs et al. ........................ 711/3 |
| 5,091,846 | A | * | 2/1992 | Sachs et al. .................... 711/130 |
| 5,394,531 | A | * | 2/1995 | Smith ............................ 711/136 |
| 5,561,783 | A | * | 10/1996 | Vanka et al. ................... 711/141 |
| 5,815,648 | A | * | 9/1998 | Giovannetti ................. 714/5.11 |
| 6,976,128 | B1 | | 12/2005 | Williams et al. |
| 6,986,010 | B2 | | 1/2006 | Sutanto et al. |
| 7,290,106 | B2 | | 10/2007 | Day et al. |
| 7,827,360 | B2 | | 11/2010 | Rahman et al. |
| 2005/0278486 | A1 | * | 12/2005 | Trika et al. .................... 711/142 |
| 2007/0180199 | A1 | | 8/2007 | Augsburg et al. |
| 2008/0177954 | A1 | | 7/2008 | Lee |
| 2011/0047437 | A1 | * | 2/2011 | Flynn ............................ 714/758 |
| 2011/0066808 | A1 | * | 3/2011 | Flynn et al. .................... 711/118 |
| 2011/0113215 | A1 | * | 5/2011 | Thomas et al. ................. 711/173 |
| 2012/0124294 | A1 | * | 5/2012 | Atkisson et al. ............... 711/135 |

OTHER PUBLICATIONS

International Search Report and Written Opinion—PCT/US2013/046966—ISA/EPO—Apr. 24, 2014.

* cited by examiner

*Primary Examiner* — Cheng-Yuan Tseng
*Assistant Examiner* — Francisco Grullon
(74) *Attorney, Agent, or Firm* — Linda G. Gunderson

(57) ABSTRACT

In a particular embodiment, a method of managing a cache memory includes, responsive to a cache size change command, changing a mode of operation of the cache memory to a write through/no allocate mode. The method also includes processing instructions associated with the cache memory while executing a cache clean operation when the mode of operation of the cache memory is the write through/no allocate mode. The method further includes after completion of the cache clean operation, changing a size of the cache memory and changing the mode of operation of the cache to a mode other than the write through/no allocate mode.

16 Claims, 5 Drawing Sheets

CACHE MEMORY WITH WRITE THROUGH, NO ALLOCATE MODE

I. CLAIM OF PRIORITY

This application claims priority from U.S. Provisional Patent Application No. 61/664,368, filed Jun. 26, 2012, entitled "CACHE MEMORY WITH WRITE THROUGH, NO ALLOCATE MODE," the contents of which are incorporated by reference in its entirety.

II. FIELD OF THE DISCLOSURE

The present disclosure is generally directed to a cache memory system having a write through/no allocate mode.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices and operate in conjunction with one or more caches. A cache is memory that may store a copy of data that exists somewhere in a memory hierarchy. In some cases, the cache may have the only "up to date" copy of the data in the system. One component of a cache is a data memory that may be divided into multiple cache lines. Another component of a cache is a mechanism (e.g., a tag) to associate a system memory address with a particular cache line. An additional component of a cache is a state indicator to indicate whether a cache line is valid, modified, owned, and the like.

When a cache memory is re-sized, re-configured, and/or a line of the cache memory is locked, access to the cache memory may be restricted. For example, to change a size of the cache memory, a clean operation copies data stored in the cache memory to a backing memory. Generally, during the clean operation, only a single thread (or only a single processor) may access the cache memory (i.e., to perform the clean operation) while other threads (or other processors) are blocked from accessing the cache. After the clean operation is completed and the size of the cache memory is changed, the other threads (or other processors) may then perform operations on the cache memory. Blocking the other threads (or other processors) from accessing the cache memory during execution of the clean operation causes a performance loss that can extend for several clock cycles. As another example, to lock or unlock a line of the cache memory, a block of addresses (including the line of the cache memory to be locked) is only accessible to a single thread (or a single processor) that operates on the block of addresses (e.g., to lock or unlock the line of the cache memory).

IV. SUMMARY

A cache memory is designed to have a "write through, no allocate" (WT/NA) mode. When the cache memory is in the WT/NA mode, multiple threads (or multiple processors) may access the cache memory using an arbitration method while the cache memory is re-sized, reconfigured, or when a line of the cache memory is locked or unlocked.

For example, during operation of a cache memory that is accessible to multiple threads (or multiple processors), a cache size change command may be received that causes a mode of operation of the cache to change to a write through/no allocate (WT/NA) mode. The mode of operation may be indicated as the WT/NA mode using a bit of a register (e.g., a universal register) that is set to indicate the WT/NA mode. When in the WT/NA mode, an instruction to store data in the cache memory is treated as a write through instruction.

In a particular embodiment, to change the size of the cache memory, a single thread (or a single processor) performs a clean operation that copies data stored in the cache memory to a backing memory. The single thread (or the single processor) performs the clean operation by executing a plurality of clean instructions to systematically clean the cache. While the single thread (e.g., a first thread) is cleaning the cache, one or more threads (or one or more processors) other than the first thread (or the first processor) may access the cache memory.

In another particular embodiment, the WT/NA mode may be utilized to lock and unlock a cache line of the cache memory. A single thread (or a single processor) may execute a tag write instruction (to lock or unlock a line of the cache) while one or more other threads (or one or more other processors) have access to the cache memory (e.g., using an arbitration policy).

In a particular embodiment, a method of managing a cache memory includes, responsive to a cache size change command, changing a mode of operation of the cache memory to a write through/no allocate mode. The method also includes processing instructions associated with the cache memory while executing a cache clean operation when the mode of operation of the cache memory is the write through/no allocate mode. The method further includes after completion of the cache clean operation, changing a size of the cache memory and changing the mode of operation of the cache memory from the write through/no allocate mode to a mode other than the write through/no allocate mode.

In another particular embodiment, an apparatus includes a register configured to indicate a mode of operation of a cache memory. The apparatus also includes a cache memory including a cache controller. The cache controller is configured to change the mode of operation of the cache memory to a write through/no allocate mode in response to a cache size change command and, when the mode of operation of the cache memory is the write through/no allocate mode, to process instructions associated with the cache memory while a cache clean operation is executed. The cache controller is further configured to, after completion of the cache clean operation, change a size of the cache memory and change the mode of operation of the cache memory from the write through/no allocate mode to a mode other than the write through/no allocate mode.

In a further embodiment, an apparatus includes means for changing a mode of operation of the cache memory to a write through/no allocate mode. The means for changing is responsive to a cache size change command. The apparatus also includes means for processing instructions associated with a cache memory while executing a cache clean operation when the mode of operation of the cache memory is the write through/no allocate mode. The apparatus further includes means for changing a size of the cache memory and changing the mode of operation of the cache memory from the write through/no allocate mode to a mode other than the write through/no allocate mode after completion of the cache clean operation.

In another embodiment, a computer readable includes instructions that, when executed by a processor, cause the processor to, responsive to a cache size change command, change a mode of operation of the cache memory to a write through/no allocate mode. The computer readable medium further includes instructions, executable by the processor, to cause the processor to process instructions associated with the cache memory while executing a cache clean operation when the mode of operation of the cache memory is the write through/no allocate mode. The computer executable instructions are further executable to cause the processor to, after completion of the cache clean operation, change a size of the cache memory and change the mode of operation of the cache memory from the write through/no allocate mode to a mode other than the write through/no allocate mode.

In another particular embodiment, a method of locking a cache line of a cache memory includes changing a mode of operation of a cache memory to a write through/no allocate mode prior to locking a cache line of the cache memory. The method also includes reading a tag state of an index corresponding to a physical address of the cache line. The method further includes verifying the tag state is unreserved and locking the cache line.

In another embodiment, an apparatus includes a cache memory and a register configured to indicate a mode of operation of the cache memory. The apparatus also includes a cache controller configured to change a mode of operation of a cache memory to a write through/no allocate mode prior to locking a cache line of the cache memory. The cache controller is further configured to read a tag state of an index corresponding to a physical address of the cache line. The cache controller is also configured to verify the tag state is unreserved and lock the cache line.

In a further embodiment, an apparatus includes means for changing a mode of operation of a cache memory to a write through/no allocate mode prior to locking a cache line of the cache memory. The apparatus also includes means for reading a tag state of an index corresponding to a physical address of the cache line. The apparatus further includes means for verifying the tag state is unreserved and means for locking the cache line.

In another embodiment, a computer readable medium includes instructions that, when executed by a processor, cause the processor to change a mode of operation of a cache memory to a write through/no allocate mode prior to locking a cache line of the cache memory. The computer readable medium further includes instructions, executable by the processor, to cause the processor to read a tag state of an index corresponding to a physical address of the cache line. The computer executable instructions are further executable to cause the processor to verify the tag state is unreserved and lock the cache line.

One particular advantage provided by disclosed embodiments is that a cache memory system having a write through/no allocate mode is enabled to process requests from a first thread (or processor) performing a particular operation (e.g., a cache re-size operation, a cache reconfigure operation, or a cache lock/unlock operation), and to process requests from at least one other thread during the particular operation. Processing requests from multiple threads during a cache re-size operation, a cache reconfigure operation, or a cache lock/unlock operation may reduce occurrences of processor pipeline stalls associated with the cache memory system. Additionally, the write through/no allocate mode may enable coherency of the cache memory to be maintained while the first thread performing the particular operation.

Other aspects, advantages, and features of the present disclosure will become apparent after review of the entire application, including the following sections: Brief Description of the Drawings. Detailed Description, and the Claims.

V. BRIEF DESCRIPTION OF THE DRAWINGS

VI. DETAILED DESCRIPTION

Figure 1:
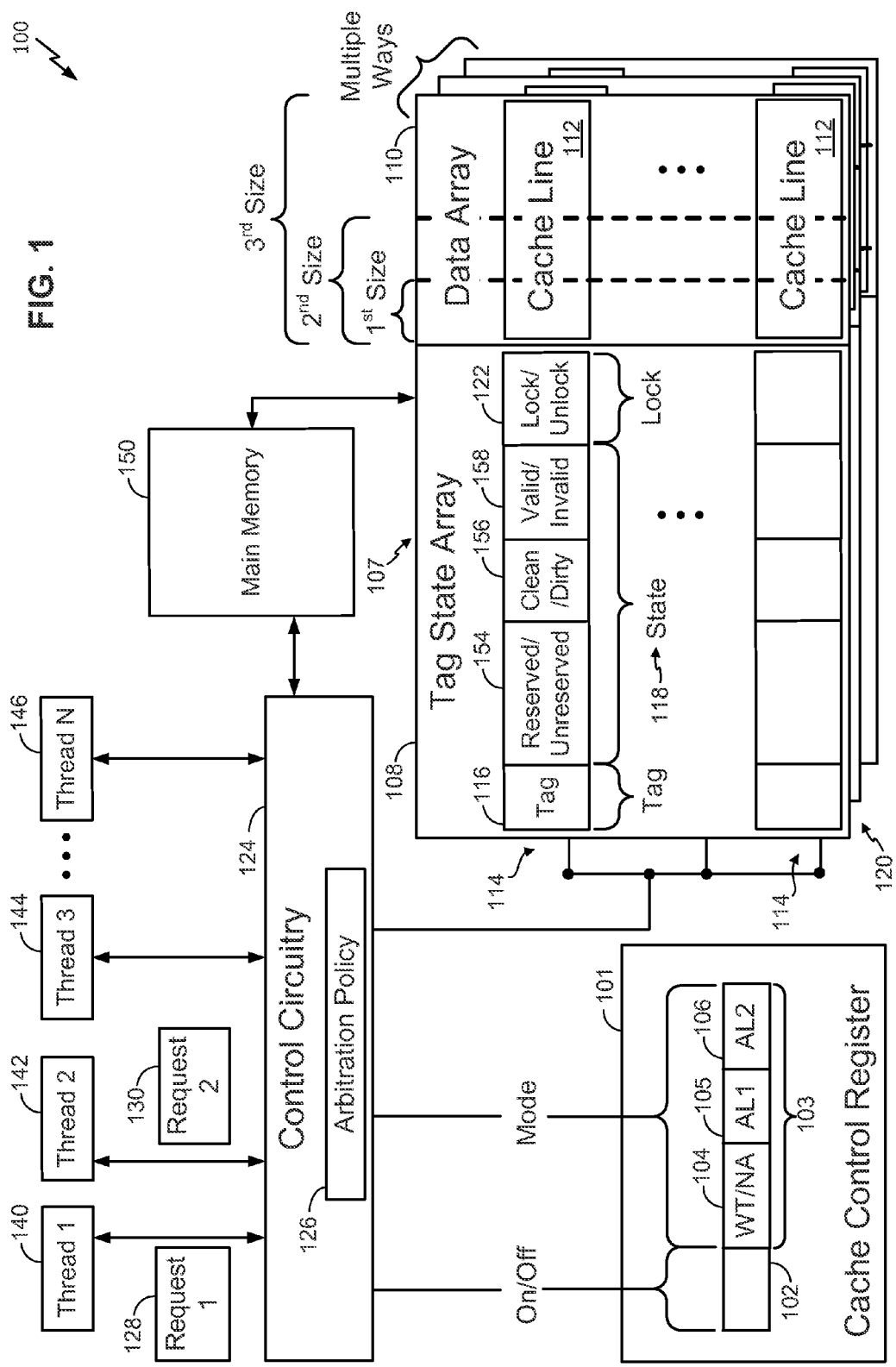
FIG. 1 is a block diagram of a particular illustrative embodiment of a configurable cache memory system having a write through/no allocate (WT/NA) mode to enable requests from multiple threads (or multiple processors) to be processed.

A cache memory system may include a cache memory (e.g., a level 2 cache memory) that is operable in one of a plurality of modes, such as a write through mode, a write back mode, a write allocate mode, a read allocate mode, a no allocate mode, a write based on attribute mode, a write through/no allocate (WT/NA) mode, or a combination thereof.

When the cache memory is in the write back mode, data is written to the cache memory without also storing the data to a backing memory. Accordingly, the write back mode allows a state (included in a tag state array) associated with the cache line to change from clean (e.g., data stored in the cache line is also stored in a backing memory) to dirty (e.g., data stored in the cache line has not been stored to the backing memory). When the cache memory is in the write through mode, all write operations (e.g., data store operations) in the cache memory system may propagate to the backing memory (e.g., a backing storage medium). For example, the cache memory may be a level 2 cache memory and the backing memory may be a level 3 cache memory or a main memory.

When the cache memory is in the write allocate mode, cache line evictions of a lower level cache memory relative to the cache memory may be allocated to the cache memory. For example, the cache memory may be a level 2 cache memory and the lower level cache memory may be a level 1 cache memory. When the cache memory is in the read allocate mode, a cache line of the cache memory may be allocated on load operations (e.g. read operations) executed in the cache memory system. When the cache memory is in the no allocate mode, no cache lines in the cache memory may be allocated. For example, no cache lines may be changed (e.g., modified) to reserved or dirty. However, the cache lines may be changed from to dirty to clean.

When the cache memory is in the write based on attribute mode, attributes (e.g., state information associated with a cache line) of a cache memory for each cache line may determine how a write operation is to be executed (e.g., executed as a write though operation or as a write back operation) in a cache memory system. The write based on attribute mode may be used in conjunction with one or more other modes, such as the write through mode or the write back mode. In a particular embodiment, the write based on attribute mode is a default mode of the cache memory. The attributes associated with a cache line may indicate whether data stored in the cache line is clean or dirty, valid or invalid, or locked or unlocked. For example, a write operation directed to the cache memory may not be performed on a cache line having attributes indicating that the cache line is reserved or locked.

When the cache memory is in the write though/no allocate (WT/NA) mode, cache lines of the cache memory are prohibited from transition to dirty or reserved states. Accordingly, any data to be stored (e.g., resulting from a write operation) will be treated as a write though and stored in the backing memory.

FIG. 1 illustrates a particular illustrative embodiment of a cache memory system 100 that may include a cache control register 101, a cache memory 107, control circuitry 124, and a main memory 150 (e.g., a random access memory (RAM)). In a particular embodiment, the cache memory 107 is a level 2 (L2) cache. The system 100 may also include one or more threads (or processors), such as threads 140-146. The L2 cache may support L2 cache partitioning (e.g., re-sizing), L2 cache line locking, and multiple operating modes (e.g., a write through/no allocate (WT/NA) mode, a no allocate mode, a write through mode, a write back mode, a read allocate mode, a write allocate mode, or a combination thereof).

The cache control register 101 may include a first portion 102 and a second portion 103. The first portion 102 may indicate an on state or an off state of the cache memory 107. The second portion 103 may indicate, via one or more stored bits, one or more operating modes of the cache memory 107 (e.g., a write through/no allocate (WT/NA) mode, a no allocate mode, a write through mode, a write back mode, a read allocate mode, a write allocate mode, or a combination thereof). In a particular embodiment, the second portion 103 includes a first field 104 to indicate the WT/NA mode, a second field 105 to indicate a first allocate based mode AL1 (e.g., a read allocate mode), and a third field 106 to indicate a second allocate based mode AL2 (e.g., a write allocate mode). An indication of a value of the first portion 102 or an indication of a value of the second portion 103 may be provided to the control circuitry 124 or may be set by the control circuitry 124. In a particular embodiment, the second portion 103 includes only two bits to indicate the operating state of the cache memory 107.

When the mode of operation of the cache memory 107 is the WT/NA mode, cache lines 112 of the cache memory 107 may be prohibited from transitioning to a dirty state (e.g., data in a particular cache line 112 has not been written back to a backing memory) or a reserved state (e.g., the particular cache line 112 is allocated and waiting for data to be written to the particular cache line 112, such as from the backing memory). That is, write through data will not change a state of the cache memory 107 (e.g., dirty lines will remain dirty) and write operations from a thread (or processor) to store data will be passed by the control circuitry 124 to a main memory (not shown). Additionally, when the mode of operation is the WT/NA mode, multiple threads (or multiple processors) may access the cache memory 107 in accordance with an arbitration policy 126. In a particular embodiment, the WT/NA mode is used when the cache memory 107 is to be re-sized or reconfigured, or when a line of the cache memory 107 is to be locked or unlocked.

The control circuitry 124 (e.g., a cache controller) may include the arbitration policy 126 and may be coupled to the cache control register 101, the cache memory 107, the main memory 150, or a combination thereof. The control circuitry 124 may be implemented by hardware, software, or a combination thereof. The control circuitry 124 may receive a plurality of requests from one or more threads or processors, such as the threads 140-146. For example, the control circuitry 124 may be coupled to a first thread 140, a second thread 142, a third thread 144, and other threads up to an $N^{th}$ thread 146. The plurality of threads may correspond to a single processor (e.g. a processor that is external to the system 100) or each thread may correspond to a processor such that multiple processors request access to the cache memory 107.

The control circuitry 124 may enable each of the plurality of threads to access the cache memory 107 and the main memory 150. For example, the control circuitry 124 may receive the first request 128 from the first thread 140 and the second request 130 from the second thread 142. Based on the arbitration policy 126, the control circuitry 124 may prioritize the first request 128 and the second request 130. After prioritizing the first request 128 and the second request 130, the control circuitry 124 may execute the first request 128 and the second request 130 in accordance with the mode of operation of the cache memory 107 as indicated by the second portion 103 of the cache control register 101. In order to execute the first request 128 and the second request 130, the control circuitry 124 may perform an action in response to the first request 128 and the second request 130 with respect to the cache memory 107, the main memory 150, or a combination thereof.

For example, the control circuitry 124 may receive a first request 128 (e.g., request 1) from a first thread 140 (e.g., thread 1) and a second request 130 (e.g., request 2) from a second thread 142 (e.g., thread 2). In a particular embodiment, the first thread and the second thread are associated with a single processor (e.g., a multithreaded processor). In another particular embodiment, the first thread is associated with the first processor and the second thread is associated with a second processor. The control circuitry 124 may set a value associated with at least one of the first portion 102 and the second portion 103 of the cache control register 101 based on a received request of the plurality of requests. In a particular embodiment, the first request 128 or the second request 130 is associated with initiation of a cache re-size operation or a cache line lock/unlock operation.

The control circuitry 124 may process the plurality of requests (e.g., the first request 128 and the second request 130) based on the value of the first portion 102 and the value of the second portion 103 of the cache control register 101. The control circuitry 124 may also utilize the arbitration policy 126 to prioritize and execute (e.g., process) the plurality of requests to reduce an occurrence of processor pipeline stalls associated with at least one of the first thread and the second thread. The arbitration policy 126 may be implemented as hardware, software, or a combination thereof.

The cache memory 107 may be coupled to the control circuitry 124 and the main memory 150. The cache memory 107 may include a tag state array 108, a data array 110, multiple sets 114, and multiple ways 120. The tag state array 108 may be coupled to the data array 110. Although FIG. 1 shows the tag state array 108 included in the cache memory 107, it should be noted that the cache memory 107 may be coupled to the tag state array 108, where the tag state array 108 is external to the cache memory 107.

The tag state array 108 may include a plurality of entries that each correspond to a cache line 112 (e.g., a storage location) of the data array 110. Each entry in the tag state array 108 may include a tag area 116, a state area 118, and a lock area 122. The tag area 116 may be addressable based on the first request 128 or the second request 130. The state area 118 may include a plurality of state bits 119 (e.g. a reserved/unreserved bit, a clean/dirty bit, a valid/invalid bit, or a combination thereof) to indicate one or more states of a corresponding cache line 112 (e.g., a state of data stored in the corresponding cache line 112). The lock area 122 may indicate whether a corresponding cache line 112 or group of cache lines is locked or unlocked.

In a particular embodiment, the state area 118 includes a reserved/unreserved field 154, a clean/dirty field 156 (e.g., indicating whether data is unmodified and matches corresponding data in the main memory 150), a valid/invalid field 158, or a combination thereof. Each of the areas (or fields) of a particular entry may correspond to a cache line (e.g., data) of the data array 110 and include one or more bits to indicate a state of the cache line. For example, the lock area 122 of a particular entry may include a lock/unlock bit to indicate whether a cache line corresponding to the particular entry is in a locked state or an unlocked state. Accordingly, cache line locking (and cache line unlocking) may be used to "lock" lines in the cache memory 107 or may be used to create tightly coupled memory (TCM) regions in the cache data array 110 of the cache memory 107. As another example, the reserved/unreserved field 154 of the particular entry may include a reserved/unreserved bit to indicate whether a cache line corresponding to the particular entry is reserved or unreserved.

The tag state array 108 and the data array 110 may include one or more sets 114. In a particular embodiment, the data array 110 includes one or more cache lines 112 and has a predetermined number of sets to store data that are each accessible via the tag state array 108. Each of the predetermined number of sets of the data array 110 may be configured to store an amount of data based on a configuration of the cache memory 107.

The data array 110 may have a size that is changed based on the configuration of the cache memory 107. For example, the data array 110 may have a first cache size corresponding to a first cache configuration, a second cache size corresponding to a second cache configuration, or a third cache size corresponding to a third cache configuration. In a particular embodiment, the second cache size is larger than the first cache size and the third cache size is larger than the first cache size and larger than the second cache size, as shown in FIG. 1. The cache memory 107 may have the same number of ways 120 in the first cache configuration, in the second cache configuration, and in the third cache configuration, as shown in FIG. 1.

During operation, the control circuitry 124 may receive a first instruction (e.g., the first request 128) from the first thread (or the first processor) and a second instruction (e.g., the second request 130) from the second thread (or the second processor). In a particular embodiment, the first instruction is a cache size change command associated with the cache memory 107, as described below. In another particular embodiment, the first instruction is a lock/unlock instruction associated with a cache line 112, as described with reference to FIG. 2. In response to receiving the first instruction (e.g. the cache size change command or the lock/unlock instruction), the control circuitry 124 may change a mode of operation of the cache memory 107, as indicated by the cache control register 101, by setting a value of the second portion 103 of the cache control register 101 to indicate the write through/no allocate (WT/NA) mode.

While the cache memory 107 is in the WT/NA mode, the control circuitry 124 may process one or more first requests from the first thread to execute and complete the lock/unlock operation or the cache size change operation as directed by the one or more first requests. When executing the lock/unlock operation or the cache size change operation, the control circuitry 124 may also process one or more second requests from the second thread. The one or more first requests and the one or more second requests may be processed based on the arbitration policy 126 and in accordance with the WT/NA mode. For example, based on the WT/NA mode, when a particular second request of the second thread is a request for a write operation to a portion of the cache memory 107 that was previously operated on (e.g., a cache line that was previously cleaned or locked) by a particular first request from the first thread, the write operation may be passed through to the main memory 150. When the cache size change operation or the lock/unlock operation is completed, the control circuitry 124 may change the mode of operation from the WT/NA mode to a mode of operation other than the WT/NA mode. For example, the control circuitry 124 may change the mode of operation to an allocate based mode (e.g., a write allocate mode, a read allocate mode, or a combination thereof).

In a particular embodiment, the control circuitry 124 receives a request from a single thread (e.g., the first thread) to perform the cache size change operation on the cache memory 107. In a particular embodiment, the cache size change operation changes a size of the cache memory 107 from a current size to a larger size (e.g. from the first size to the second size or the third size). In another particular embodiment, the cache size change operation may change the size of the cache memory 107 from the current size to a smaller size (e.g., from the third size to the first size or the second size). The single thread (or a single processor) may be configured to perform the cache size change operation by executing a plurality of instructions. As part of executing the plurality of instructions, the single thread (or the single processor) may issue one or more first requests (e.g., the first request 128) associated with the cache size change operation to the control circuitry 124. In response to receiving an initial request of the one or more first requests (e.g., the one or more first requests associated with a cache re-size operation or a cache line lock/unlock operation), the control circuitry 124 may set the mode of operation of the cache memory 107 to the WT/NA mode via the cache control register 101.

To change the size of the cache memory 107, the single thread (or the single processor) may perform a clean operation via the control circuitry 124 by issuing one or more cache clean requests that copy data stored in the cache memory 107 to a backing memory (not shown). The single thread (or the single processor) may issue the plurality of clean requests to systematically clean the cache memory 107. In a particular embodiment, the single thread may initiate the cache clean operation and execute the cache clean operation as a plurality of cache clean instructions. While the single thread (e.g., the first thread) is cleaning the cache memory 107, one or more second threads (or one or more second processors), other than the first thread (or the first processor), may access the cache memory 107 via the control circuitry 124 by issuing one or more second requests (e.g., the second request 130).

For example, the single thread (e.g. a first thread) may initiate the cache clean operation and execute the cache clean operation as a plurality of cache clean instructions. The control circuitry 124 may receive at least one cache clean instruction of the plurality of cache clean instructions. Additionally, when the mode of operation is the WT/NA mode, the control circuitry 124 may receive a first instruction associated with the cache memory 107 from a second thread and a second instruction associated with the cache memory 107 from a third thread. The control circuitry 124 may arbitrate between the first thread, the second thread, and the third thread to select one of the at least one cache clean instruction, the first instruction, or the second instruction. The control circuitry 124 may execute the selected instruction prior to executing the non-selected instructions. In a particular embodiment, the selected instruction is the first instruction corresponding to a data store instruction for the cache memory 107. When the first instruction (e.g., the data store instruction) is executed and the mode of operation is the WT/NA mode, the first instruction is treated (e.g. executed) as a write through instruction. Accordingly, data associated with the data store instruction may be written to a backing memory and not written to the cache memory 107 when the cache memory is in the WT/NA mode.

In a particular embodiment, the control circuitry 124 may receive one or more cache clean instructions (as part of the cache re-size operation) associated with the cache memory 107 from the single thread (e.g., a first thread), receive a first instruction associated with the cache memory 107 from a second thread, and receive a second instruction from a third thread. The control circuitry 124 may arbitrate between the first thread, the second thread, and the third thread to select one of the cache clean instructions, the first instruction, or the second instruction to be performed on the cache memory 107. Accordingly, the cache memory 107 may be accessible to multiple threads (e.g., the first thread, the second thread, and the third thread) during the cache clean portion of the cache re-size operation.

The control circuitry 124 may process the one or more first requests and the one or more second requests in parallel based on the arbitration policy 126 to allocate access to the cache memory 107 among the multiple threads (e.g., between the single thread performing the clean operation and the other multiple threads). In a particular embodiment, the arbitration policy 126 may use a round robin approach to process the one or more first requests and the one or more second requests. When the cache memory 107 is in the WT/NA mode, the one or more second threads (or the one or more second processors) may be permitted to execute read requests on the cache memory 107. However, write requests (e.g., a store data request or a store data instruction) from the one or more second threads (or the one or more second processors) may be treated as a write through request so the write request does not create new data in the cache memory 107. In this manner, the cache memory 107 may be clean after completion of the clean operation performed by the single thread. Accordingly, requests (e.g., instructions) from the other threads to access the cache memory 107 may still be processed while the cache size change operation (e.g., the cache clean operation) is being executed by the single thread.

When the clean operation is completed, the single thread (or the single processor) may issue a request to temporarily turn off the cache memory 107 via the first portion 102 of the cache control register 101 (e.g., changing the mode of operation of the cache memory to an "off" mode). The single thread (or the single processor) may then issue a request to set the size of the cache memory 107 to zero. Setting the size of the cache memory 107 to zero may have the effect of disabling the cache memory 107. The single thread (or the single processor) may then issue a request to perform a cache kill operation. The cache kill operation may be used to clear and initialize the cache memory 107 by invalidating tag bits and clearing all lock bits in the tag state array 108. Execution of the cache kill operation may eliminate unknown data stored in the tag state array 108 and clear all pending cache memory updates so that the cache memory 107 is not populated with unknown data after the re-size operation is completed. In a particular embodiment, the cache kill operation may be a non-blocking operation and may be executed by a state machine that sets (e.g., clears) all state bits of the tag state array 108 to invalid.

After the cache kill operation, the single thread (or the single processor) may set the cache memory 107 to a desired size. In a particular embodiment, the size of the cache memory 107 may be set to one of zero (0) kilobytes (kB), sixty-four (64) kB, one hundred twenty-eight (128) kB, two hundred fifty-six (256) kB, or five hundred twelve (512) kB. The size of the cache memory 107 may be allocated from a beginning (e.g., a start) of a memory map indicative of a structure of the data array 110 of the cache memory 107 and any memory not allocated as the cache memory 107 may be considered tightly coupled memory (TCM).

The single thread (or the single processor) may request the cache memory 107 to be turned on after the desired size of the cache memory 107 is set. The control circuitry 124 may turn on (e.g., enable) the cache memory 107 (e.g., changing the mode of operation of the cache memory to an "on" mode) via the first portion 102 of the cache control register 101. The control circuitry 124 may also change the mode of operation of the cache memory 107 from the WT/NA mode to another mode of operation, such as an allocate based mode (e.g. AL1 105 or AL2 106), after the desired size of the cache memory 107 is set. In a particular embodiment, the mode of operation of the cache memory 107 may be changed from the WT/NA mode when the cache memory 107 is turned off (e.g., disabled). The mode of operation of the cache memory 107 may be changed by the control circuitry 124 or the single thread changing a value of a bit of the second portion 103 of the cache control register 101. In another particular embodiment, the mode of operation of the cache memory 107 may be changed from the WT/NA mode after the cache memory is turned on (e.g., enabled). The mode of operation may be changed from the WT/NA mode to a write based on attribute mode.

Use of the WT/NA mode during certain operations, such as cache resizing, may enable multiple threads (or multiple processors) to access the cache memory 107 in accordance with the arbitration policy 126. By treating data stores (e.g., write operations) as write through operations as dictated by the WT/NA mode, clean data stored in the cache memory 107 will not become dirty due to such data stores. Accordingly, the cache memory 107 will include clean data after completion of the clean operation when the size of the cache memory 107 is changed. In a particular embodiment, the WT/NA mode is used while the cache memory 107 is re-sized or reconfigured. Accordingly, access to the cache memory 107 during such operations is not be restricted to a single thread (or a single processor), such as the first thread, during execution of an operation on the cache memory 107 by the single thread (or the single processor). Multiple threads (e.g., multiple processors or multiple clients), such as the second thread, may access (e.g., use) the cache memory 107 during a cache resize operation, a cache re-configure operation, a cache line lock/unlock operation, or another operation performed on the cache memory 107 when the mode of operation of the cache memory 107 is the WT/NA mode.

In another particular embodiment, during operation of the system 100, the control circuitry 124 may receive one or more first requests (e.g., the first request 128) from the first thread 140 and one or more second requests (e.g., the second request 130) from the second thread 142. The one or more first requests 128 may be associated with a cache lock/unlock instruction (e.g., a cache lock/unlock request) associated with a cache line of the cache memory 107. For example, the first thread 140 may be associated with a single thread that causes the control circuitry 124 to execute a cache lock operation or a cache unlock operation associated with the cache lock/unlock instruction. In a particular embodiment, the cache lock/unlock instruction is a cache lock instruction. In another particular embodiment, the cache lock/unlock instruction is a cache unlock instruction.

In response to receiving the cache lock/unlock instruction, the control circuitry 124 may set the operating mode of the cache to the WT/NA mode via the cache control register 101. When the mode of operation is the WT/NA mode, multiple threads (or multiple processors) may access the cache memory 107 based on the arbitration policy 126 (e.g., the control circuitry 124 may implement an arbitration method). Accordingly, access to the cache memory 107 may not be restricted to the first thread 140 (or the first processor) during execution of the cache lock/unlock instruction on the cache memory 107 by the first thread 140 (e.g., the single thread).

To execute the cache lock/unlock operation, the first thread 140 may issue a tag write instruction (e.g., a tag write request) to lock or unlock a line of the cache memory 107 while one or more other threads (e.g., the second thread 242) have access to the cache memory 107 based on the arbitration policy 126. In a particular implementation, the control circuitry 124 receives the tag write instruction and reads a tag of the tag state array 108 corresponding to a physical address of the cache line to be locked. The control circuitry 124 may also read a tag state of the state area 118 of the tag state array 108 to verify that the tag state is "not reserved" (i.e., the cache line is not currently waiting for data).

When the tag state is verified as not reserved, the tag state array 108 (including a tag area 116, a state area 118, and a lock area 122) is updated to lock the cache line corresponding to the cache lock/unlock operation. For example, the control circuitry 124 (e.g., a cache controller) may update the tag state array 108 to lock the cache line, such as by writing the tag that corresponds to the physical address of the cache line to be locked in the tag area 108, setting (e.g., marking) the valid/invalid field 158 of the state area 118 as invalid, and setting at least one bit (e.g., a locking bit) in the lock area 122. In a particular embodiment, a particular cache line may be locked when the control circuitry 124 asserts the locking bit (e.g., sets a value of the locking bit to a high value). A similar process may be used to unlock the cache line where the locking bit is unset (e.g., de-asserted) to unlock the cache line when the mode of operation is the WT/NA mode. In a particular embodiment, the locking bit is masked to unlock the cache line.

The arbitration policy 126 may be used to ensure that while control circuitry 124 is reading (or modifying) a particular tag entry of the tag state array 108 associated with the cache line of the cache memory 107 to be lock or unlocked, no other thread (or processor) is permitted to substantively change a state (e.g., data or status bits) of the cache line. For example, if the one or more second requests 130 from the second thread 142 are associated with a write operation to an area of the cache memory 107 that has been locked, the write operation may be passed through to the main memory 150. When the lock/unlock is completed, the control circuit 124 may set the mode of operation of the cache memory 107 from the WT/NA mode to a mode other than the WT/NA mode. For example, the control circuit 124 may set the mode of operation to an allocate based mode (e.g., a write allocate mode and/or a read allocate mode) via the cache control register 101.

The WT/NA mode may enable multiple threads (or multiple processors) to access (e.g. use) the cache memory 107 in accordance with the arbitration policy 126. In a particular embodiment, the WT/NA mode is used when a line of the cache memory 107 is locked or unlocked. Accordingly, access to the cache memory 107 may not be restricted to a single thread (or processor), such as the first thread 140, during execution of a cache line lock/lock operation on the cache memory 107 when the mode of operation of the cache memory 107 is the WT/NA mode.

Figure 2:
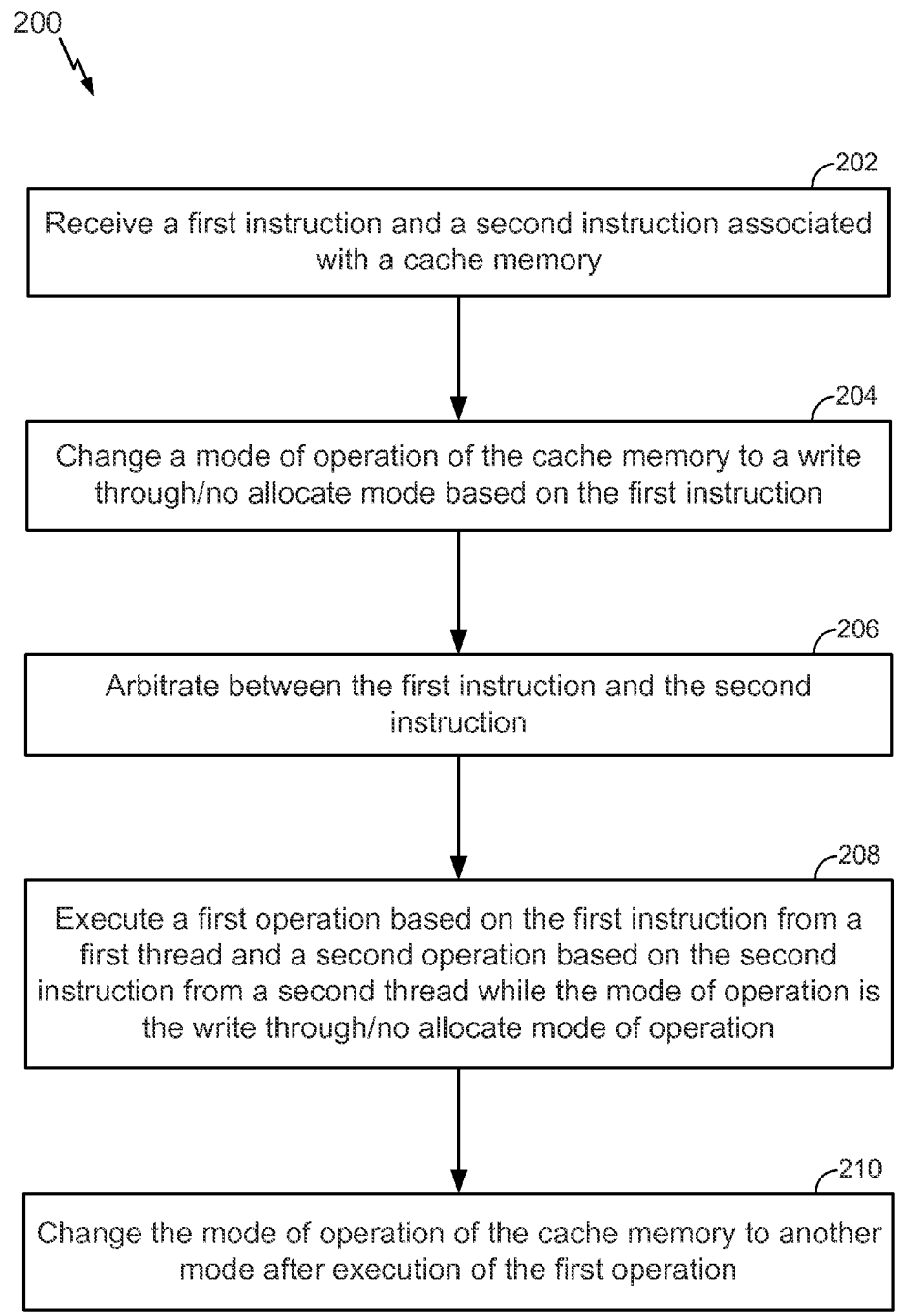
FIG. 2 is a flow diagram of an illustrative embodiment of a method of managing a cache memory to execute multiple instructions from multiple threads (or multiple processors) while the cache memory is in a write through/no allocate (WT/NA) mode.

Referring to FIG. 2, a flow diagram of an illustrative embodiment of a method 200 to execute multiple instructions from multiple threads (or multiple processors) while a cache memory is in a write through/no allocate (WT/NA) mode is illustrated. For example, the cache memory may include the cache memory 107 of FIG. A first instruction and a second instruction associated with the cache memory may be received, at 202. In a particular embodiment, control circuitry, such as the control circuitry 124 of FIG. 1, may receive the first instruction and the second instruction. For example, the first instruction and the second instruction may include the first request 128 and the second request 130, respectively, of FIG. 1.

A mode of operation of the cache memory may be changed to a write through/no allocate mode based on the first instruction, at 204. In a particular embodiment, one of the first instruction or the second instruction is a cache resize instruction or a cache lock/unlock instruction. The control circuitry may change a mode of operation of a cache control register to the write through/no allocate (WT/NA) mode based on the first instruction or the second instruction. For example, the cache control register may include the cache control register 101 of FIG. 1. The cache control register may be a universal register (e.g., a global register). In a particular embodiment, the mode of operation of the cache memory is indicated as the write through/no allocate mode by setting a universal bit (e.g., a global bit) of the universal register.

Arbitration may occur between the first instruction and the second instruction, at 206. The control circuitry may arbitrate between the first instruction and the second instruction based on an arbitration policy. For example, the arbitration policy may include the arbitration policy 126 of FIG. 1. The arbitration policy 126 may use a round robin approach to arbitrate between one or more threads (or processors). The arbitration policy may arbitrate between (e.g., prioritize) the first instruction and the second instruction with preference given to (from highest priority to lowest priority) tag updates, data access requests, instruction retrieval requests, level two (L2) cache memory population, and cache memory line clean requests. One of skill in the art will appreciate that the preference presented is an illustrative example and that other orders of preferences are available. The arbitration policy may be implemented as hardware, software, or a combination thereof. In a particular embodiment, the arbitration policy may be implemented using one or multiplexors.

A first operation based on the first instruction from a first thread and a second operation based on the second instruction from a second thread may be executed while the mode of operation is the write through/no allocate mode of operation, at 208. The control circuitry may process one or more first instructions, such as the first request 128 of FIG. 1, and one or more second instructions, such as the second request 130 of FIG. 1, using an arbitration policy. The mode of operation of the cache memory may be changed to another mode after execution of the first operation, at 210. The control circuitry may change the mode of operation from the WT/NA mode to a mode other than the WT/NA mode such as an allocate based mode of operation (e.g. e.g., a write allocate mode, a read allocate mode, or a combination thereof).

In accordance with the method 200, when the cache memory is operating in the WT/NA mode, multiple threads (or multiple processors) may be able to access the cache memory 107. Accordingly, access to the cache memory, such as the cache memory 107 of FIG. 1, in the WT/NA mode is not restricted to a single thread (or processor), such as the first thread, during execution of an operation, such as a cache re-size operation or a cache line lock/unlock operation, on the cache memory by the single thread (or processor).

Figure 3:
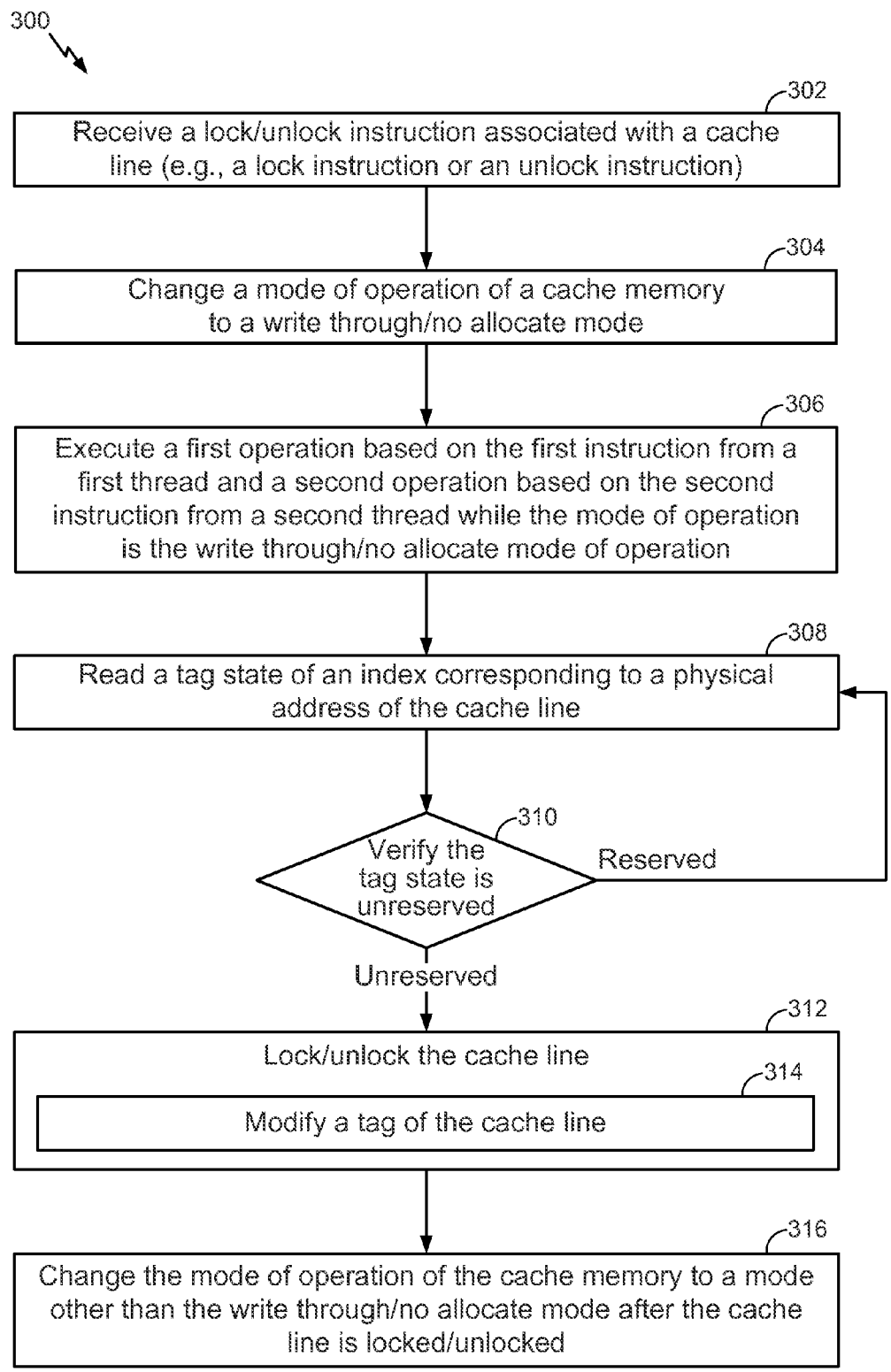
FIG. 3 is a flow diagram of an illustrative embodiment of a method to execute a cache lock/unlock instruction on a cache memory having a write through/no allocate (WT/NA) mode.

Referring to FIG. 3, a flow diagram of an illustrative embodiment of a method 300 to manage a cache memory is depicted. The cache memory has a write through/no allocate (WT/NA) mode that is used during execution of a cache lock/unlock instruction (e.g., a cache lock/unlock operation). A lock/unlock instruction associated with a cache line may be received, at 302. A control circuit may receive the lock/unlock instruction associated with the cache line of a cache memory. For example, the control circuit and the cache memory may include the control circuitry 124 and the cache memory 107 of FIG. 1, respectively. In a particular embodiment, the lock/unlock instruction is a lock instruction to lock a particular cache line of the cache memory. In another particular embodiment, the lock/unlock instruction is an unlock instruction to unlock the particular cache line of the cache memory.

A mode of operation of a cache memory is changed to a write through/no allocate mode, at 304. The mode of operation may be changed prior to locking or unlocking the cache line of the cache memory. The control circuitry may change a mode of operation indicated at a cache control register to the write through/no allocate (WT/NA) mode based on the lock/unlock instruction. For example, the cache control register may include the cache control register 101 of FIG. 1.

A first operation based on a first instruction from a first thread and a second operation based on a second instruction from a second thread may be executed while the mode of operation is the write through/no allocate mode of operation, at 306. The control circuitry may also process (e.g., execute) one or more first requests from a first thread (or a first processor) and one or more second requests from a second thread (or a second processor). The control circuitry may process the one or more first requests and the one or more second requests using an arbitration policy. An order of the first operation and the second operation may be determined based on the arbitration policy. For example, the second operation may be determined to be performed before the first operation. In a particular embodiment, the second operation is a write operation and the first operation is a lock/unlock operation associated with the received lock/unlock instruction. The second operation (e.g., the write operation) may be processed as a write though operation based on the WT/NA mode.

A tag state of an index corresponding to a physical address of the cache line is read, at 308, and the tag state is verified as unreserved, at 310. The cache line may be indicated by the cache lock/unlock instruction as the cache line to be locked or unlocked based on the cache lock/unlock instruction. The cache controller may read the tag state array of the cache memory and verify that a tag state of the tag state array is unreserved. For example, the tag state array may include the tag state array 108 of FIG. 1. When the tag state of the index is determined to be reserved, the method 300 may return to 308. In a particular embodiment, the control circuit waits (e.g., a time period) for the tag state to be unreserved. While the control circuit is waiting, additional instructions may be executed via the control circuit based on the arbitration policy.

When the tag state is determined to be unreserved, the cache line is locked/unlocked, at 312. In a particular embodiment, the cache line is locked based on the cache lock/unlock instruction. In another particular embodiment, the cache line is unlocked based on the cache lock/unlock instruction. The cache line may be locked/unlocked by modifying a tag of the cache line, at 314. The control circuitry may lock or unlock the cache line by setting or unsetting (e.g., masking), respectively, a bit of the tag state array.

The mode of operation of the cache memory may be changed to a write based on attribute mode after the cache line is locked/unlocked, at 316. After the cache line is locked or unlocked, depending on the nature of the cache lock/unlock instruction, the cache controller may cause a universal bit to be set that indicates an operating mode of the cache memory other than the WT/NA mode. The control circuitry may change the mode of operation from the WT/NA mode to a mode other than the write through/no allocate mode. For example, the mode other than the write through/no allocate mode may be an allocate based mode of operation (e.g. a read allocate mode or a write allocate mode).

In accordance with the method 300, the WT/NA mode may enable multiple threads (or multiple processors) to access the cache memory, such as the cache memory 107 of FIG. 1, during execution of a cache lock/unlock operation. Access to the cache memory in the WT/NA mode is not restricted to a single thread (or processor), such as the first thread, during execution of a cache line lock/lock operation on the cache memory. By not restricting access to the cache memory to the single thread, processor pipeline stalls associated with restricted access to the cache memory may be reduced.

Figure 4:
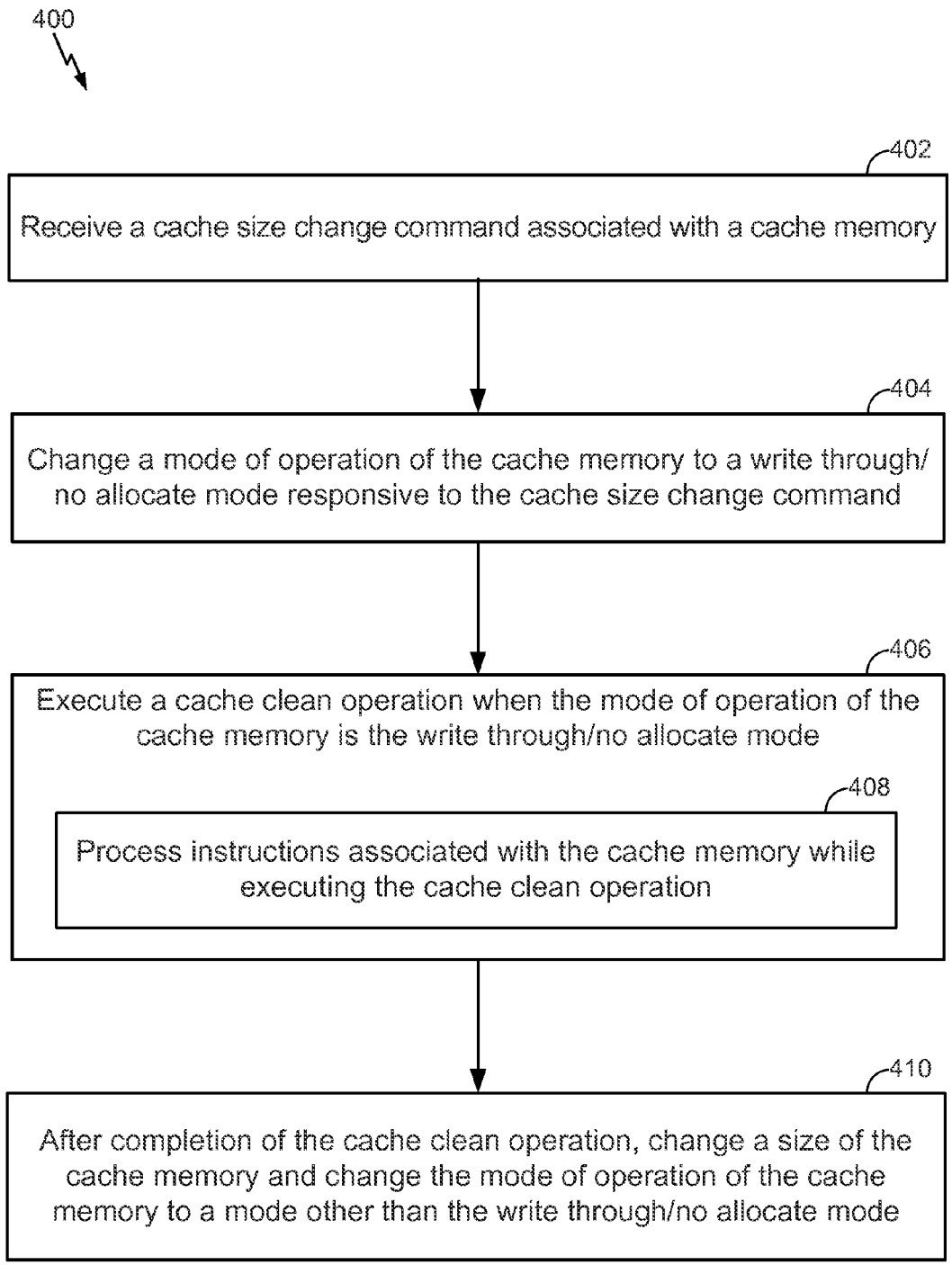
FIG. 4 is a flow diagram of an illustrative embodiment of a method to execute a cache re-size operation on a cache memory having a write through/no allocate (WT/NA) mode.

Referring to FIG. 4, a flow diagram of an illustrative embodiment of a method 400 to execute a cache re-size operation on a cache memory having a write through/no allocate (WT/NA) mode is depicted. A cache size change command associated with a cache memory may be received, at 402. A control circuit may receive the cache size change command associated with the cache memory. For example, the control circuit and the cache memory may include the control circuitry 124 and the cache memory 107 of FIG. 1, respectively.

A mode of operation of the cache memory is changed to a write through/no allocate mode responsive to the cache size change command, at 404. The control circuitry may change a mode of operation indicated by a cache control register to the write through/no allocate (WT/NA) mode based on a cache size change command. For example, the cache control register may include the cache control register 101 of FIG. 1.

A cache clean operation may be executed when the mode of operation of the cache memory is the write through/no allocate mode, at 406. Instructions associated with the cache memory are processed while executing the cache clean operation, at 408. The instructions associated with the cache memory may include one or more instructions that access the cache memory, a backing memory, or a combination thereof. The control circuitry may process (e.g., execute) one or more first requests from a first thread (or a first processor) and one or more second requests from a second thread (or a second processor) while the cache memory is being cleaned. The control circuitry may process the one or more first requests and the one or more second requests using an arbitration policy.

After completion of the cache clean operation, a size of the cache memory is changed and the mode of operation of the cache memory is changed from the WT/NA mode to another mode (e.g., to a mode other than the write through/no allocate mode), such as a write based on attribute based mode, at 410. Alternatively, the control circuitry may change the mode of operation from the WT/NA mode to another mode such as an allocate based mode of operation (e.g. a read allocate mode or a write allocate mode).

In accordance with the method 400, the WT/NA mode may enable multiple threads (or multiple processors) to access the cache memory, such as the cache memory 107 of FIG. 1, during a cache re-size operation or a cache reconfigure operation. Accordingly, multiple threads (e.g., multiple processors or multiple clients), such as the second thread 142 of FIG. 1, may access (e.g., use) the cache memory 107 during a cache re-size operation or a cache re-configure operation executed by a first thread.

A cache having a write through/no allocate (WT/NA) mode in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

Figure 5:
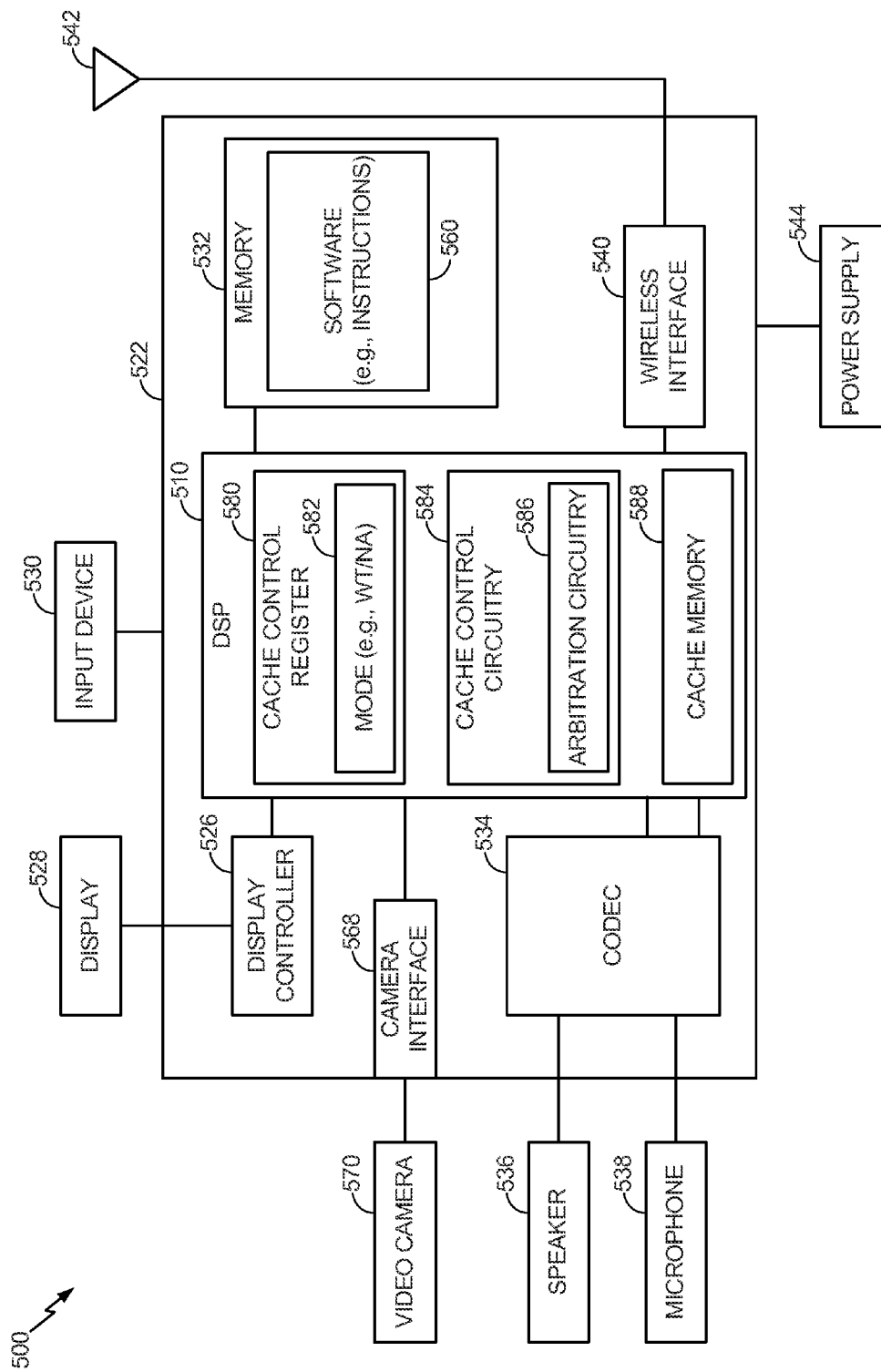
FIG. 5 is a block diagram of a particular embodiment of a device including a cache memory system having a write through/no allocate (WT/NA) mode.

FIG. 5 is a block diagram of particular embodiment of a device 500 (e.g., a communication device) including a cache memory system having a write through/no allocate (WT/NA) mode. The device 500 may be a wireless electronic device and include a processor 510, such as a digital signal processor (DSP), coupled to a memory 532. The memory 532 may include the memory 150 of FIG. 1. The device 500 may include a cache control register 580, cache control circuitry 584, and a cache memory 588 (e.g., an L2 cache). The cache control register 580 may include a mode field 582 to indicate a mode of operation (e.g., a write through/no allocate (WT/NA) mode) of the cache memory 588. For example, the cache control register 580 may include the cache control register 101 of FIG. 1. The cache control circuitry 584 may include arbitration circuitry 586 to enable the cache control circuitry 584 to arbitrate (e.g., prioritize) multiple requests (e.g., multiple instructions) to access the cache memory 588 that are received from a plurality of threads (or a plurality of processors). For example, the cache control circuitry 584 may include the control circuitry 124 of FIG. 1. In a particular embodiment, the plurality of threads is associated with a single processor, such as the DSP 510.

The cache control register 580, the cache control circuitry 584, and the cache memory 588 may be included in the DSP 510 or may be implemented as one or more separate devices or circuitry (not shown) external to the DSP 510. In an illustrative example, the DSP 510 includes any of the system of FIG. 1, operates in accordance with any of the embodiments of FIGS. 2-4, or any combination thereof. For example, as shown in FIG. 5, the cache control register 580, the cache control circuitry 584, and the cache memory 588 are accessible to the digital signal processor (DSP) 510, and the digital signal processor 510 is configured to access data or program instructions stored at the cache memory 588 or at the memory 532.

A camera interface 568 is coupled to the processor 510 and also coupled to a camera, such as a video camera 570. A display controller 526 is coupled to the processor 510 and to a display device 528. A coder/decoder (CODEC) 534 can also be coupled to the processor 510. A speaker 536 and a microphone 538 can be coupled to the CODEC 534. A wireless interface 540 can be coupled to the processor 510 and to a wireless antenna 542 such that wireless data received via the antenna 542 and wireless interface 540 can be provided to the processor 510.

The processor 510 may be configured to execute computer executable instructions 566 stored at a non-transitory computer-readable medium, such as the memory 532, that are executable to cause a computer, such as the processor 510, to change a mode of operation of the cache memory 588 to a write through/no allocate mode responsive to a cache size change command. The computer executable instructions 566 are further executable to cause the processor 510 to process instructions that access the cache memory 588 while executing a cache clean operation when the mode of operation of the cache memory 588 is the write through/no allocate mode. The computer executable instructions are further executable to, after completion of the cache clean operation, change a size of the cache memory 588 and change the mode of operation of the cache memory 588 to a mode other than the write through/no allocate mode.

The processor 510 may be configured to execute the computer executable instructions 566 to change a mode of operation of a cache memory 588 to a write through/no allocate mode prior to locking a cache line of the cache memory 588. The computer executable instructions 566 may further be executable to read a tag state of an index corresponding to a physical address of the cache line. The computer executable instructions 566 may be further executable to verify the tag state is unreserved and to lock the cache line when the tag state is unreserved.

In a particular embodiment, the processor 510, the display controller 526, the memory 532, the CODEC 534, the wireless interface 540, and the camera interface 568 are included in a system-in-package or system-on-chip device 522. In a particular embodiment, an input device 530 and a power supply 544 are coupled to the system-on-chip device 522. Moreover, in a particular embodiment, as illustrated in FIG. 5, the display device 528, the input device 530, the speaker 536, the microphone 538, the wireless antenna 542, the video camera 570, and the power supply 544 are external to the system-on-chip device 522. However, each of the display device 528, the input device 530, the speaker 536, the microphone 538, the wireless antenna 542, the video camera 570, and the power supply 544 can be coupled to a component of the system-on-chip device 522, such as an interface or a controller.

The methods 200-400 of FIGS. 2-4 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 200 of FIG. 2, the method 300 of FIG. 3, the method 400 of FIG. 4, or any combination thereof, can be initiated by a processor that executes instructions stored in the memory 532, as described with respect to FIG. 5.

In conjunction with one or more of the described embodiments, an apparatus is disclosed that may include means for changing a mode of operation of a cache memory to a write through/no allocate mode, where the means for changing is responsive to a cache size change command. The means for changing a mode of operation may include the control circuitry 124 of FIG. 1, the DSP 510 of FIG. 5, one or more other devices or circuits configured to change a mode of operation, or any combination thereof.

The apparatus may also include means for processing instructions associated with a cache memory while executing a cache clean operation when the mode of operation of the cache memory is the write through/no allocate mode. The means for processing instructions may include the control circuitry 124 of FIG. 1, the DSP 510 of FIG. 5, one or more other devices or circuits configured to change a mode of operation, or any combination thereof.

The apparatus may also include means for changing a size of the cache memory and changing the mode of operation of the cache memory to a mode other than the write through/no allocate mode after completion of the cache clean operation. The means for changing the size of the cache memory and changing the mode of operation may include the control circuitry 124 of FIG. 1, the DSP 510 of FIG. 5, one or more other devices or circuits configured to change a mode of operation, or any combination thereof.

In conjunction with one or more of the described embodiments, an apparatus is disclosed that may include means for changing a mode of operation of a cache memory to a write through/no allocate mode prior to locking a cache line of the cache memory. The means for changing a mode of operation may include the control circuitry 124 of FIG. 1, the DSP 510 of FIG. 5, one or more other devices or circuits configured to change a mode of operation, or any combination thereof.

The apparatus may also include means for reading a tag state of an index corresponding to a physical address of the cache line. The means for reading may include the control circuitry 124 of FIG. 1, the DSP 510 of FIG. 5, one or more other devices or circuits configured to change a mode of operation, or any combination thereof.

The apparatus may also include means for verifying the tag state is unreserved. The means for verifying may include the control circuitry 124 of FIG. 1, the DSP 510 of FIG. 5, one or more other devices or circuits configured to change a mode of operation, or any combination thereof.

The apparatus may also include means for locking the cache line. The means for locking may include the control circuitry 124 of FIG. 1, the DSP 510 of FIG. 5, one or more other devices or circuits configured to change a mode of operation, or any combination thereof.

One or more of the disclosed embodiments may be implemented in a system or an apparatus, such as the device 500, that may include a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-5 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of managing a cache memory, the method comprising:
 receiving a first instruction from a first thread and a second instruction from a second thread;
 changing a mode of operation of the cache memory to a write through/no allocate mode based on the first instruction from the first thread, wherein in the write through/no allocate mode, cache lines of the cache memory are prohibited from transition to dirty states or reserved states and if the second instruction from the second thread is a data store instruction, the data store instruction is treated as a write through instruction, wherein in response to the data store instruction, data are stored in a backing memory;

arbitrating between the first instruction from the first thread and the second instruction from the second thread;

executing a first operation based on the first instruction from the first thread and a second operation based on the second instruction from the second thread in response to the mode of operation of the cache memory is the write through/no allocate mode; and after execution of at least the first operation, changing the mode of operation of the cache memory to a mode other than the write through/no allocate mode.

2. The method of claim 1, wherein the first instruction from the first thread is a cache clean instruction.

3. The method of claim 1, wherein the first instruction from the first thread is a cache lock or unlock instruction.

4. The method of claim 1, wherein arbitrating between the first instruction from the first thread and the second instruction from the second thread comprises prioritizing access to the cache memory between the first instruction from the first thread and the second instruction from the second thread.

5. The method of claim 1, wherein the mode other than the write through/no allocate mode is a write based on attribute mode.

6. The method of claim 2, further comprising after execution of a cache clean operation:
issuing a request to turn off the cache memory;
issuing a request to set a size of the cache memory to zero; and
issuing a request to perform a cache kill operation, wherein the cache kill operation clears and initializes the cache memory.

7. The method of claim 6, further comprising after the cache kill operation, setting the cache memory to a size different than a size previous to the cache kill operation, and turning on the cache memory.

8. An apparatus comprising:
a register configured to indicate a mode of operation of a cache memory; and
a cache memory comprising a cache controller, wherein the cache controller is configured to:
receive a first instruction from a first thread and a second instruction from a second thread;
change the mode of operation of the cache memory to a write through/no allocate mode based on the first instruction from the first thread, wherein in the write through/no allocate mode, cache lines of the cache memory are prohibited from transition to dirty states or reserved states and if the second instruction from the second thread is a data store instruction, the data store instruction is treated as a write through instruction, wherein in response to the data store instruction, data are stored in a backing memory;
arbitrate between the first instruction from the first thread and the second instruction from the second thread;
execute a first operation based on the first instruction from the first thread and a second operation based on the second instruction from the second thread in response to the mode of operation of the cache memory is the write through/no allocate mode; and
after execution of at least the first operation, change the mode of operation of the cache memory to a mode other than the write through/no allocate mode.

9. The apparatus of claim 8, wherein the first instruction from the first thread is a cache clean instruction.

10. The apparatus of claim 8, wherein the first instruction from the first thread is a cache lock or unlock instruction.

11. The apparatus of claim 8, wherein arbitrate between the first instruction from the first thread and the second instruction from the second thread comprises prioritizing access to the cache memory between the first instruction from the first thread and the second instruction from the second thread.

12. The apparatus of claim 8, wherein the mode other than the write through/no allocate mode is a write based on attribute mode.

13. The apparatus of claim 9, wherein the cache controller is further configured to after execution of a cache clean operation:
issue a request to turn off the cache memory;
issue a request to set a size of the cache memory to zero; and
issue a request to perform a cache kill operation, wherein the cache kill operation clears and initializes the cache memory.

14. The apparatus of claim 13, wherein the cache controller is further configured to after the cache kill operation, set the cache memory to a new size, and turn on the cache memory.

15. An apparatus comprising:
means for receiving a first instruction from a first thread and a second instruction from a second thread;
means for changing a mode of operation of the cache memory to a write through/no allocate mode based on the first instruction from the first thread, wherein in the write through/no allocate mode, cache lines of the cache memory are prohibited from transition to dirty states or reserved states and if the second instruction from the second thread is a data store instruction, the data store instruction is treated as a write through instruction, wherein in response to the data store instruction, data are stored in a backing memory;
means for arbitrating between the first instruction from the first thread and the second instruction from the second thread;
means for executing a first operation based on the first instruction from the first thread and a second operation based on the second instruction from the second thread in response to the mode of operation of the cache memory is the write through/no allocate mode; and
means for changing the mode of operation of the cache memory to a mode other than the write through/no allocate mode after execution of at least the first operation.

16. A non-transitory computer readable medium comprising instructions that when executed by a processor, cause the processor to:
receive a first instruction from a first thread and a second instruction from a second thread;
change a mode of operation of the cache memory to a write through/no allocate mode based on the first instruction from the first thread, wherein in the write through/no allocate mode, cache lines of the cache memory are prohibited from transition to dirty states or reserved states and if the second instruction from the second thread is a data store instruction, the data store instruction is treated as a write through instruction, wherein in response to the data store instruction, data are stored in a backing memory;
arbitrate between the first instruction from the first thread and the second instruction from the second thread;
execute a first operation based on the first instruction from the first thread and a second operation based on the second instruction from the second thread in response to the mode of operation of the cache memory is the write through/no allocate mode; and after execution of at least the first operation, change the mode of operation of the cache memory to a mode other than the write through/no allocate mode.

* * * * *